United States Patent
Reckziegel et al.

(10) Patent No.: US 11,247,626 B2
(45) Date of Patent: Feb. 15, 2022

(54) METHOD FOR CONTROLLING A PASSENGER PROTECTION DEVICE

(71) Applicant: Robert Bosch GmbH, Stuttgart (DE)

(72) Inventors: Bastian Reckziegel, Kirchheim/Nabern (DE); Erich Sonntag, Marbach Am Neckar (DE); Gunther Lang, Stuttgart (DE); Parisa Ebrahim, Stuttgart (DE); Simon Koenig, Moeckmuehl (DE)

(73) Assignee: Robert Bosch GmbH, Stuttgart (DE)

( * ) Notice: Subject to any disclaimer, the term of this patent is extended or adjusted under 35 U.S.C. 154(b) by 131 days.

(21) Appl. No.: 16/344,190

(22) PCT Filed: Oct. 4, 2017

(86) PCT No.: PCT/EP2017/075124
§ 371 (c)(1),
(2) Date: Apr. 23, 2019

(87) PCT Pub. No.: WO2018/086799
PCT Pub. Date: May 17, 2018

(65) Prior Publication Data
US 2019/0256027 A1 Aug. 22, 2019

(30) Foreign Application Priority Data
Nov. 10, 2016 (DE) .......... 102016222082.9

(51) Int. Cl.
*B60R 21/0132* (2006.01)
*B60R 21/013* (2006.01)

(52) U.S. Cl.
CPC ........ *B60R 21/0133* (2014.12); *B60R 21/013* (2013.01); *B60R 21/0132* (2013.01); *B60R 2021/01304* (2013.01)

(58) Field of Classification Search
CPC .............. B60R 21/0133; B60R 21/013; B60R 2021/01304
See application file for complete search history.

(56) References Cited

U.S. PATENT DOCUMENTS 3,911,391 A * 10/1975 Held .................... B60R 21/0173
180/274
5,173,614 A * 12/1992 Woehrl ............... B60R 21/0133
180/282

(Continued)

FOREIGN PATENT DOCUMENTS

CN 1168655 A 12/1997
CN 1812902 A 8/2006

(Continued)

OTHER PUBLICATIONS

International Search Report for PCT/EP2017/075124, dated Dec. 19, 2017.

*Primary Examiner* — Peter D Nolan
*Assistant Examiner* — Kenneth M Dunne
(74) *Attorney, Agent, or Firm* — Norton Rose Fulbright US LLP; Gerard Messina (57) ABSTRACT

A method for ascertaining a state value representing a condition of a surface, in particular, of a road, traveled upon by a vehicle. The vehicle includes at least one inertial sensor. The method is characterized in that the state value is increased or decreased as a function of at least one first signal acquired by the inertial sensor.

20 Claims, 5 Drawing Sheets

(56) References Cited

U.S. PATENT DOCUMENTS

| | | | | |
|---|---|---|---|---|
| 5,418,722 A * | 5/1995 | Cashler | ............... | B60R 21/0132 |
| | | | | 180/282 |
| 5,668,740 A * | 9/1997 | Wang | ................. | B60R 21/0132 |
| | | | | 307/10.1 |
| RE36,122 E * | 3/1999 | Mattes | ................ | B60R 21/0133 |
| | | | | 180/268 |
| 6,330,500 B1 * | 12/2001 | Moriyama | ............ | B60R 21/013 |
| | | | | 180/232 |
| 6,480,772 B1 * | 11/2002 | Ugusa | ................. | B60R 21/0133 |
| | | | | 701/46 |
| 2002/0169534 A1 | 11/2002 | Yamashita | | |
| 2015/0088368 A1 * | 3/2015 | Varady | ................. | B60W 40/06 |
| | | | | 701/31.7 |

FOREIGN PATENT DOCUMENTS

| | | | | |
|---|---|---|---|---|
| CN | 104071109 A | | 10/2014 | |
| CN | 104709215 A | | 6/2015 | |
| CN | 105813903 A | | 7/2016 | |
| DE | 102006051786 B3 | | 4/2008 | |
| DE | 102011118149 A1 | | 5/2013 | |
| EP | 0511556 | * | 11/1992 | ....... B60R 21/01332 |
| EP | 0727336 A1 | * | 8/1996 | ......... B60R 21/0132 |
| EP | 2868532 A1 | | 5/2015 | |
| JP | H0891169 A | | 4/1996 | |
| JP | H08108820 A | | 4/1996 | |
| JP | H09175322 A | | 7/1997 | |
| JP | H11124004 A | | 5/1999 | |
| JP | 2000335364 A | | 12/2000 | |
| JP | 2015221592 A | | 12/2015 | |
| WO | WO-2008052608 A1 | * | 5/2008 | ........... B60R 22/415 |

\* cited by examiner

METHOD FOR CONTROLLING A PASSENGER PROTECTION DEVICE

FIELD OF THE INVENTION

The present invention relates to a method for controlling a passenger protection device.

BACKGROUND INFORMATION

A method for operating a safety system of a motor vehicle is discussed in DE 10 2011 118 149 A1. In this method, a current traffic situation is classified. In addition, a probability of an occurrence of a collision type from a plurality of predetermined collision types is ascertained in the classified, current traffic situation. If the ascertained probability exceeds a predetermined threshold value, a triggering threshold for activating at least one occupant protection device is adjusted.

SUMMARY OF THE INVENTION

The present invention describes a method for ascertaining a state value representing a condition of a surface, in particular, of a road, traveled upon by a vehicle. The vehicle includes at least one inertial sensor. The method is characterized in that the state value is increased or decreased as a function of at least one first signal acquired by the inertial sensor.

This method may be executed, in particular, in a vehicle, which is equipped with a corresponding sensor. Alternatively, the method may also be executed on a remote processing unit, which, for example, receives and evaluates sensor values acquired in one or more vehicles. For example, the transmission may be carried out wirelessly or via the internet. The acquired data regarding the road traveled upon may subsequently be shared with a plurality of vehicles via, for example, a suitable communications interface, such as a cloud. In this manner, vehicles not having a corresponding, integrated function or not having the necessary sensor system also receive data regarding the condition of a particular surface, that is, a particular road and/or a particular section of road.

After it is determined, the state value may be made available to one or more further functions. The further function may be implemented, for example, in the vehicle and be configured for triggering safety devices and/or a passenger protection system and/or restraining devices. It is also conceivable for the function to be provided for controlling a suspension, for example, a shock absorber or an air suspension.

The condition of a surface, in particular, of a road, may be understood to mean whether the surface has a good or poor foundation; for example, if many potholes are present on the surface, a lot of debris or stones are lying around, or the surface has a highly smooth upper surface. In this connection, in particular, the effect of the condition of the surface and/or of the road on an inertial sensor system and/or crash sensors in a vehicle is important.

For example, yaw rate sensors or acceleration sensors may be understood as an inertial sensor. In addition to these types of sensors, pressure sensors may be used as crash sensors. Therefore, a signal representing a yaw rate and/or an acceleration value may be understood as the first signal acquired by at least one inertial sensor.

An advantage of this method is that the condition of the surface traveled upon by a vehicle may be determined in a highly simple and cost-effective manner. In addition, the determination is based on measured sensor values, which may also be used for crash detection. Consequently, synergistic effects, which contribute, in turn, towards increasing the safety of road users, are produced in the retrieval of the acquired data.

In one further specific embodiment of the method, the state value is increased, if the first signal reaches or exceeds a signal threshold value, and/or the state value is decreased, if the first signal falls below the signal threshold value.

An advantage of this specific embodiment of the method is that the state value represents a realistic condition of the surface, in particular, of a road, traveled upon by the vehicle. In order to prevent every little vehicle movement or vibration from having an effect on the state value, the first signal must first reach a signal threshold value, before an increase in the state value occurs.

In this connection, the signal threshold value and/or a plurality of signal threshold values may turn out to be different and/or may be defined/determined differently in a manner specific to the vehicle and sensor. In this way, it is additionally possible to ensure that the method is adapted optimally to different vehicles.

In one further specific embodiment of the method, the state value is increased by a predefined penalty, if the first signal exceeds a signal threshold value.

An advantage of this specific embodiment is that instances of considerable roughness are weighted higher, and consequently, the probability of a misinterpretation of crash signals is reduced. In addition, by increasing the state value by a penalty in response to exceedance of the signal threshold value, the number of acceleration peaks, and consequently, the frequency of shocks, has an influence on the state value. This is also an important criterion for determining a condition of a surface traveled upon by the vehicle.

In this connection, exceedance of the signal threshold value is understood to mean that the signal was previously below the signal threshold value and, after the exceedance, lies above the signal threshold value.

In one further specific embodiment of the method, the penalty is increased as a function of an ascertained and/or measured amplitude of the first signal.

An advantage of this specific embodiment of the method is that during the determination of the state value of a surface, instances of roughness of different levels are also given weightings of different magnitudes. In this manner, it is possible to obtain an exact measure of the actual condition of the surface, using the state value. In this specific embodiment, the penalty may be added to the state value somewhat offset from the time of exceedance, so that the peak amplitude may initially be determined. Alternatively, or in addition, the peak amplitude may also influence one or more succeeding penalties.

In a further specific embodiment of the method, the state value is increased continuously, as long as the first signal exceeds a signal threshold value; in particular, the state value being increased linearly.

In this case, the state value is increased continuously, as long as the first signal lies above a signal threshold value, unlike the previously mentioned penalty, by which the state value is increased only once in response to an instance of exceedance of a signal threshold value.

An advantage of this specific embodiment is that the time span, in which the first signal exceeds the signal threshold value, is also taken into account in the determination of the state value, that is, has an influence on it. This time span is also a measure of the condition of a surface traveled upon. Consequently, longer trips on very rough ground are, in particular, of greater consequence in a determination of the state value.

In a further specific embodiment of the method, the state value is decreased continuously, as long as the first signal falls below a signal threshold value. In this case, in particular, the state value is decreased linearly.

An advantage of this specific embodiment is that in response to good conditions of the surface, in particular, of the road, the state value may decrease again. This, in turn, improves the quality of the state value. Consequently, events, which occur one time or rarely, such as running over a sidewalk, are not weighted too heavily, which means that misinterpretations of the condition of the surface traveled upon may be prevented.

In one further specific embodiment of the method, the state value is increased as a function of time. In this connection, the level of increase, that is, how rapidly the state value increases per unit time, is a function of an ascertained and/or measured amplitude of the first signal.

This specific embodiment allows more intense instances of roughness over a longer period of time to have an influence on the state value and, consequently, to be weighted higher. This provides a further option of setting parameters in such a manner, that the state value ultimately ascertained represents as accurate as possible a measure of the actual condition of the surface.

In one further specific embodiment of the method, the state value increases more intensely per time period in response to the exceedance of the signal threshold by the first signal, than it decreases in the same time period in response to the first signal's falling below the temporal threshold value.

In this specific embodiment, one-time increases or decreases in the state value are not meant, but continuous increases or decreases in the state value over time. This specific embodiment allows, in turn, the actual condition of the surface or road to be represented by the state value in an optimum manner. In addition, or as an alternative, this specific embodiment may be used for increasing the state value by a penalty in response to the exceedance of a signal threshold value. If a penalty is not added on, then the more rapid increase in the state value in response to the exceedance of the signal threshold value by the first signal may ensure that times, during which high vibrations are measured, are weighted more heavily than times without vibrations, that is, times, during which the first signal falls below the signal threshold value.

In addition, a method of controlling a passenger protection device for a vehicle is claimed. In this connection, the passenger protection device is activated, when a crash is ascertained by a crash detection function, in particular, as a function of at least one signal of a crash sensor. In this case, the crash detection function is rendered more sensitive as a function of a signal of a surround sensor system. This increase in sensitivity additionally occurs as a function of a condition of a surface, in particular, of a road, traveled upon by the vehicle.

A passenger protection device may be understood as any device, which is configured to protect a person involved in a collision. This includes, for example, airbags for vehicle occupants, belt tensioners, airbags for people outside of the vehicle, and, for example, further safety devices, such as mechanisms for raising an engine hood to protect pedestrians.

A crash detection function is understood as a function, which ascertains if a crash is occurring, in particular, as a function of at least one signal of a crash sensor. Representative crash detection functions are known from the related art.

Increasing the sensitivity of the crash detection function is understood to mean that a crash is detected, that is, a corresponding signal is outputted by the crash detection function, more rapidly or earlier in time. To this end, for example, a crash threshold value may be reduced. An increase in sensitivity may also be understood as modified processing of a signal acquired by a crash sensor. Given the same boundary conditions (for example, accelerations, forces, etc. acting upon the vehicle), by processing the at least one signal of a crash sensor, a passenger protection device may be triggered earlier than in the case of no processing. For example, a multiplication factor or a value added to or subtracted from the signal may change. A comparable result may also be obtained when a crash threshold value is lowered.

In this case, the condition of a surface, in particular, of a road, traveled upon by the vehicle may be received and/or ascertained in many different ways. Either a determination may take place in the vehicle, or data may be received, which contain information about a condition of the surface traveled upon by the vehicle. These may have been ascertained, for example, using the method described above. Conditions of surfaces, in particular, of roads, may also be stored on a digital map; in this method, the conditions being able to be retrieved. Alternatively, data regarding the condition of a road may also be received from other vehicles or a central location. For example, a plurality of vehicles may transmit data about the road condition to a cloud, which subsequently makes them available to further vehicles. The data may also be evaluated and processed in the cloud. To this end, it is sufficient for only the sensor data of the vehicles to be transmitted to the cloud or an external server. A suitable method for ascertaining a state value representing the condition of the surface traveled upon could be carried out in the cloud or on the external server in a corresponding manner.

The method put forward here has the advantage that misinterpretations of crash signals, such as false triggerings of passenger protection devices, may be reduced, in particular, when vehicles are on surfaces or roads, whose conditions have negative effects on a crash sensing system. This is, in particular, the case with rough roads having potholes and/or stones.

In one further specific embodiment of the method, a crash is determined if a crash signal ascertained with the aid of at least one signal acquired by a crash sensor exceeds a crash threshold value.

In general, the algebraic sign may be changed during a determination of signals, so that an instance of exceedance becomes one of unattainment. Of course, such changes in the method represent possible alternatives, which should also fall under the scope of protection of this application.

In one advantageous specific embodiment of the present invention, the crash detection function is rendered more sensitive by adjusting, in particular, lowering the crash threshold value.

An advantage of this specific embodiment of the present invention is that a decision as to whether a passenger protection device should be triggered may be made earlier. Consequently, it is possible to react more rapidly to an imminent collision, and therefore, to ensure optimized activation of a passenger protection device. This increases the safety of all road users.

In one further specific embodiment of the method, the crash detection is rendered more sensitive as a function of at least one surround sensor signal, if an imminent collision is detected with the aid of the at least one surround sensor signal.

For example, an imminent collision may be detected by ascertaining a collision probability with the aid of the at least one surround sensor signal. In some instances, variables, which may be acquired by evaluation of the surround sensor signal, may have an influence on this; for example, the direction of travel of a crash object, e.g., of a further vehicle, the direction of travel of the ego vehicle, the velocity of different objects, sizes of objects, etc. Objects may be understood as all objects and/or possible collision objects detectable with the aid of the surround sensor system. Further data about the ego vehicle, such as the velocity, the steering angle, or further evaluations of further control units, may also be included in this data. For example, an information item may be used, which is in regard to how high the current brake or steering pressure is and how rapidly a driving maneuver may be executed. Therefore, whether a collision is imminent, or the probability of its being imminent, may be ascertained, using a combination of all of the data. For example, a threshold probability value may be defined, in response to the exceedance of which it may be assumed that a collision is imminent. Consequently, a collision is detected in the event that this threshold value is exceeded.

In one advantageous specific embodiment of the present invention, the condition of a surface, in particular, of a road, traveled upon by the vehicle is determined with the aid of the above-described method for ascertaining a state value representing a condition of a surface, in particular, of a road, traveled upon by a vehicle.

In a further specific embodiment of the present invention, the crash detection function is not rendered more sensitive, if a condition of a surface, in particular, a road, traveled upon by the vehicle is rated as disruptive to the crash detection function. In particular, the condition of a surface traveled upon by the vehicle is rated as disruptive to the crash detection function, if the state value exceeds a state threshold value.

Other methods are also considered in place of rating the condition of a surface traveled upon by the vehicle, using the state value. For example, data regarding the state of a road may be acquired from a digital map. Alternatively, this data may also be retrieved, for example, from a cloud. In these alternative options for determining a condition of a road, a state value does not necessarily have to be acquired and/or evaluated. The data may be transmitted in any manner at all, for example, using a zero for a "good" and a one for a "poor" road condition.

This specific embodiment provides the advantage, that misinterpretations of crash signals may be reduced, in particular, when the vehicle is on surfaces or roads, which are in poor condition.

In the cases in which the state threshold value is not exceeded, an increase in sensitivity may take place. For increasing sensitivity, e.g., a crash threshold value may be lowered. A plurality of state threshold values may also be set, in response to the unattainment or exceedance of which specific increases in sensitivity may be made, for example, stepped adjustments of the crash threshold value or a plurality of crash threshold values.

In a further specific embodiment of the method, the crash threshold value is increased, if a condition of a surface, in particular, a road traveled upon by the vehicle, is rated as disruptive to the crash detection function. In this connection, in particular, the condition of a surface traveled upon by the vehicle is rated as disruptive, if the state value exceeds a state threshold value.

An advantage of this specific embodiment of the method is that misinterpretations of crash signals may be reduced. If, for example, a vehicle is on a very bumpy road, then, in unfavorable cases, a situation of a crash detection function may be misinterpreted, since a crash threshold value is exceeded due to the high vibration. Such cases may be prevented by increasing the crash threshold value in response to detecting a surface traveled upon by the vehicle, which is in poor condition or in a condition disruptive to the crash detection function. This allows the safety of all road users to be increased further.

Further advantages are obtained in the use of a computer program, which is stored on a machine-readable storage medium and induces a processing unit to implement a method according to the above-mentioned variants, when it is executed on the processing unit.

Consequently, a storage medium is also claimed, on which a computer program configured to execute at least one of the methods described above is stored.

A further advantageous, specific embodiment of the present invention manifests itself in the processing unit, in particular, in a controller for an electrical machine, which is configured to execute at least one method according to the above-mentioned variants, using the computer program provided on the processing unit, in particular, on a storage medium of the processing unit, and/or using a suitable integrated circuit. This produces synergies, since the processing unit, in particular, the controller, is not only used for regulating the electrical machine, but is also configured to execute the method of the present invention. For example, the processing unit may be configured to control an airbag or another passenger protection device as a function of the adapted crash detection function.

DETAILED DESCRIPTION

In addition to crash sensors installed in a vehicle, surround sensors installed in the vehicle may also be used for reliably detecting collisions. The two information items may be used together for the best possible reliability of the crash determination. If, for example, after an evaluation of signals of surround sensors, it is determined that a collision with an object could be imminent, a crash detection function, which is carried out in light of an evaluation of the signals of crash sensors, may be rendered more sensitive. This means that in the case of an occurrence of an actual crash, it is possible to trigger restraining devices or passenger protection devices more rapidly. However, if the vehicle is on poor terrain, for example, a very rough road, then an increase in sensitivity to a crash may have negative effects. This problem is solved by the present invention and the following exemplary embodiments.

Figure 1:
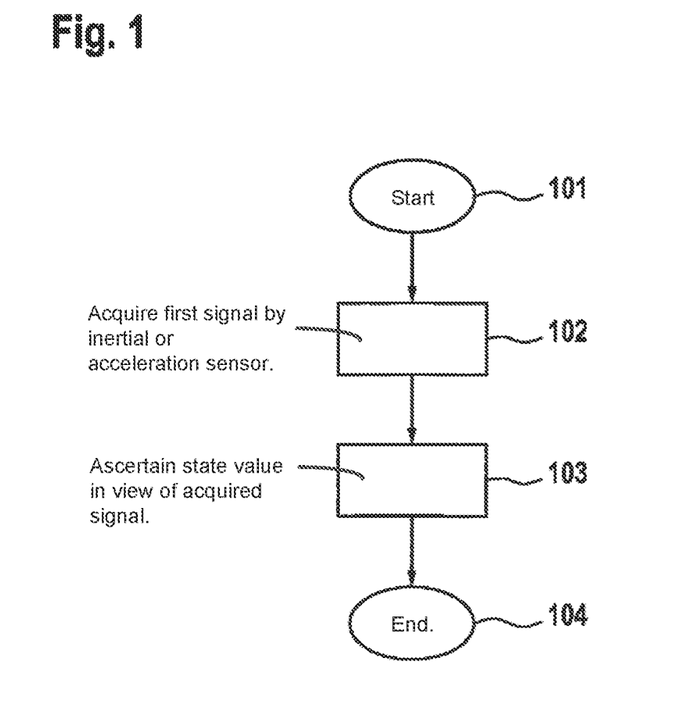
FIG. 1 shows a schematic flow chart of a method.

A method for ascertaining a state value representing a condition of a surface traveled upon by a vehicle is depicted in FIG. 1. The state value may be ascertained for all conceivable surfaces, on which a vehicle may travel; for example, streets, dirt roads, parking spaces, deserts, beaches, and/or ice surfaces. For this, the vehicle includes at least one inertial sensor, in this example, an acceleration sensor. In addition, the vehicle includes a processing unit, which may receive signals of the acceleration sensor, and on which the method described in the following may be executed. The method starts at step 101.

In step 102, a first signal, which, in this exemplary embodiment, corresponds to an acceleration signal, is acquired by the inertial sensor or the acceleration sensor.

In step 103, the state value representing the condition of a surface traveled upon by the vehicle is ascertained in view of the acquired acceleration signal. In this example, this takes place in the processing unit, which may receive and evaluate the acceleration signals acquired by the acceleration sensor. In this connection, the state value is increased or decreased as a function of the first signal acquired by the acceleration sensor.

The method ends at step 104. To continuously monitor or determine a surface traveled upon by the vehicle, it is also useful to execute the method continuously. Therefore, the operation shown in FIG. 1 is executed continuously as a loop, so that after reaching step 104, the method starts again at step 101. In this manner, the state value changes continuously as a function of the condition of the surface traveled upon.

Figure 2:
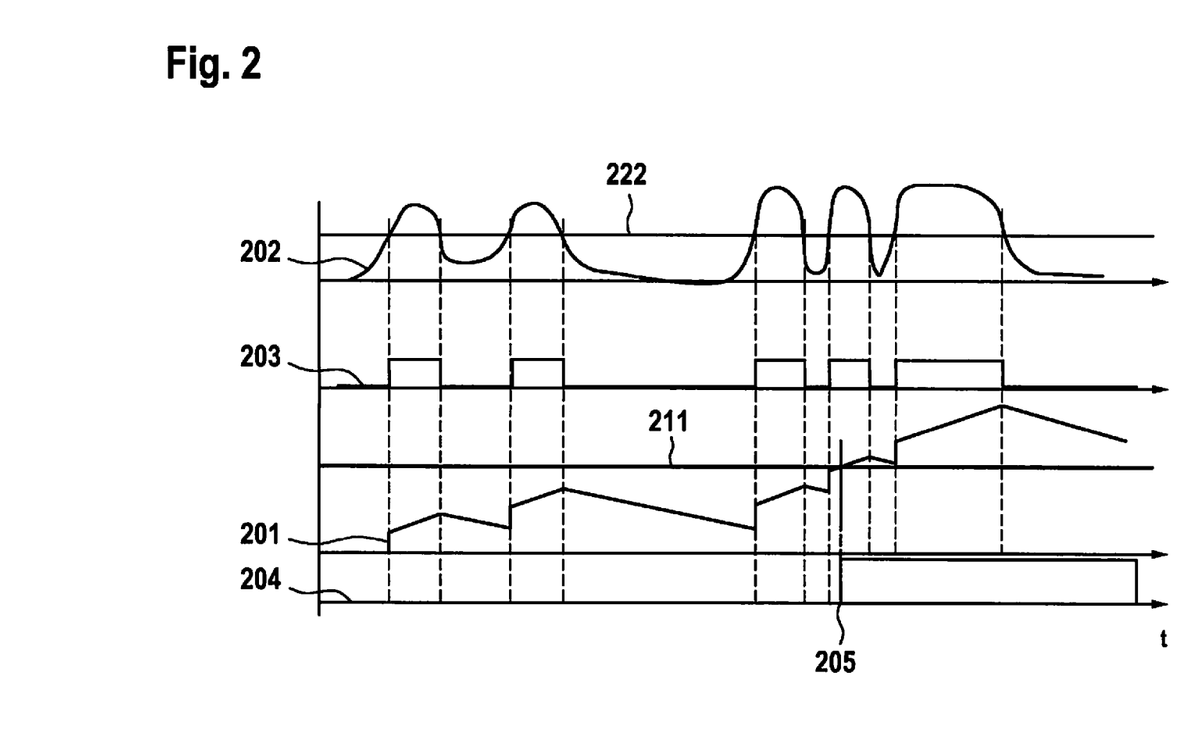
FIG. 2 shows an example of a determination of the state value.

How a possible calculation of state value 201 may be made, is shown in detail in FIG. 2. The characteristic of different variables versus time t is depicted. These variables include state value 201, first signal 202, which, in this exemplary embodiment, corresponds to an acceleration signal 202, an event variable 203, and a misuse variable 204. Event variable 203 is always set to one, when acceleration signal 202 exceeds a predefined signal threshold value 222. Otherwise, event variable 203 is equal to zero. Misuse variable 204 remains set to zero, as long as state value 201 does not exceed a state threshold value 211. If state value 201 exceeds state threshold value 211, then misuse variable 204 is set to one. This misuse variable 204 may be used, for example, to communicate a road state to a further function. If misuse variable 204 is equal to zero, then one may assume that a road condition is present, which does not have a disruptive influence on, for instance, measured values of an acceleration sensor installed in a vehicle. In contrast to that, if misuse variable 204 is equal to one, it may be assumed that a road condition is present, which could negatively affect further measured values or evaluation methods, such as crash identification.

In the following, the manner in which state value 201 changes as a function of first signal or acceleration signal 202 is explained in more detail. If acceleration signal 202 exceeds signal threshold value 222, then state value 201 increases by a predefined penalty. In this example, the penalty is fixed and corresponds to the level of state value 201 immediately after acceleration value 202 first exceeds signal threshold value 222. State value 201 is always increased by the penalty, when acceleration signal 202 exceeds signal threshold value 222 from below. This means that acceleration signal 202 is initially less than signal threshold value 222 and is subsequently equal to or greater than signal threshold value 222.

As long as acceleration signal 202 exceeds signal threshold value 222, event variable 202 is set to one. During this time, state value 201 increases linearly at a fixed slope.

If acceleration signal 202 falls below signal threshold value 222 again, then event variable 203 is reset to zero. State value 201 decreases during these time intervals. In this exemplary embodiment, the decrease takes place linearly and at the same slope as, but opposite in sign to the increase in state value 201 in response to the exceedance of signal threshold value 222 by acceleration signal 202. If state value 201 reaches a value of zero, then it does not continue to decrease, but remains at zero until acceleration signal 202 exceeds signal threshold value 222 again.

Misuse variable 204 is then set exactly to one, if state value 201 exceeds a state threshold value 211. In this exemplary embodiment, time to 205 is reached after a certain period of time. Misuse variable 204 remains set to one, until state value 201 falls below state threshold value 211 again.

In an alternative specific embodiment, it is provided that after it has been set to one, that is, after state value 201 has exceeded state threshold value 211, the misuse variable 204 stay set to one for a certain, predefined period of time. During this period of time, misuse variable 204 even remains set to one, if state value 201 falls below state threshold value 211 again. For example, the period of time may be set to several minutes. In this exemplary embodiment, it is set to 10 minutes. Using this specific embodiment, it may be ensured that a reliable determination of the road condition is even possible during trips on roads, whose conditions change frequently.

In one alternative specific embodiment of the method, the slopes of the state value differ when acceleration signal 202 exceeds or falls below signal threshold value 222. This means that, for example, in response to the acceleration signal's 202 exceeding signal threshold value 222, state value 201 increases more sharply per time period than it decreases in the same period in response to the acceleration signal's 202 falling below signal threshold value 222. In this exemplary embodiment, the state value is not increased by a penalty in response to the first signal's exceeding the signal threshold value.

In one further specific embodiment, state value 201 increases not linearly, but exponentially, in response to acceleration signal's 202 exceeding signal threshold value 222. In this case, the longer acceleration signal 202 exceeds signal threshold value 222, the more rapidly state value 201 increases per unit time. Likewise, a nonlinear characteristic may be provided for a decrease in state value 201 in response to acceleration signal's 202 falling below signal threshold value 222. In this exemplary embodiment, however, the state value decreases linearly, as well.

In a further specific embodiment, the amplitude of acceleration signal 202 is also evaluated and affects the magnitude of the penalty and the degree of increase of state value 201. For example, the higher an amplitude of acceleration signal 202 is, the greater the slope, at which state value 201 is increased per unit time, may be selected to be, as long as acceleration signal 202 exceeds signal threshold value 222.

In one alternative specific embodiment of the method, state value 201 is not increased by a penalty in response to acceleration signal's 202 exceeding signal threshold value 222. Instead, an increase only takes place in the time intervals, in which event variable 203 is set to one, and consequently, acceleration signal 202 exceeds signal threshold value 222.

Figure 3:
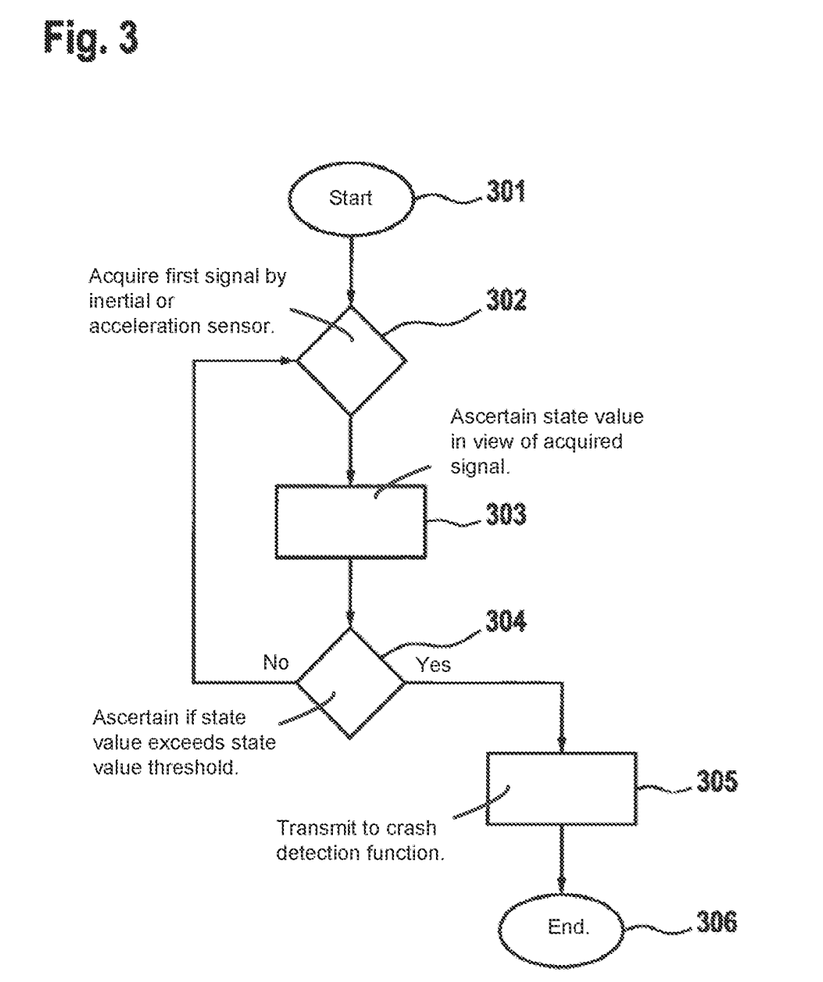
FIG. 3 shows a flow chart of a method.

A further schematic flow chart of a method is represented in FIG. 3. This starts in step 301. In this connection, steps 302 and 303 correspond to steps 102 and 103, respectively.

Consequently, a signal of an initial sensor is acquired in step 302. In step 303, a state value 201 is increased or decreased in light of this signal. In this exemplary embodiment, this increase or decrease in state value 201 takes place in accordance with the first method described with reference to FIG. 2.

In step 304, it is ascertained if state value 201 exceeds a state threshold value 211. If state threshold value 211 is not exceeded by state value 201, then the method returns to step 302, in which a signal of an inertial sensor is acquired once more, and subsequently, in step 303, state value 201 is updated.

However, if state threshold value 211 is exceeded by state value 201, this information item is transmitted to a crash detection function. This crash detection function is configured to detect a crash. At least one signal of a crash sensor is read in for this. In this exemplary embodiment, a plurality of acceleration signals are read in. With the aid of the crash detection function, a crash signal is ascertained from these acceleration signals. If this crash signal exceeds a predefined crash threshold value, then a crash is detected by the crash detection function. Subsequently, this information may be used, for example, to trigger a passenger protection device. In this exemplary embodiment, a driver-side airbag is triggered, as soon as the crash signal exceeds the crash threshold value.

In step 304, if it is now determined that state value 201 is exceeding a state threshold value 211, then, in step 305, this information item is transmitted to the crash detection function.

The method ends at step 306.

In one alternative specific embodiment of the method, state value 201 may also be transmitted continuously to the crash detection function. If a predefined state threshold value 211 is exceeded, this information may be used by the crash detection function to prevent a crash detection from being rendered more sensitive. This may be useful, for example, if, in addition to the acceleration values, the crash detection function evaluates data from surround sensors or these have an effect on the crash detection. It is conceivable, for example, for a crash detection function to be rendered more sensitive, e.g., a crash threshold value to be reduced, if, with the aid of the signals of surround sensors, it is determined that a crash is imminent. If a vehicle is simultaneously on a road, which is in poor condition and could therefore influence the crash detection function, since, for example, high acceleration values are measured, which are to be attributed to poor road conditions, but not to any collision, such an increase in sensitivity of the crash detection function may lead to misinterpretations of the situation.

In one alternative specific embodiment, the crash detection function is not transmitted the state value 201, but a misuse variable 204, as is ascertained, for example, in the method put forward above.

Figure 4:
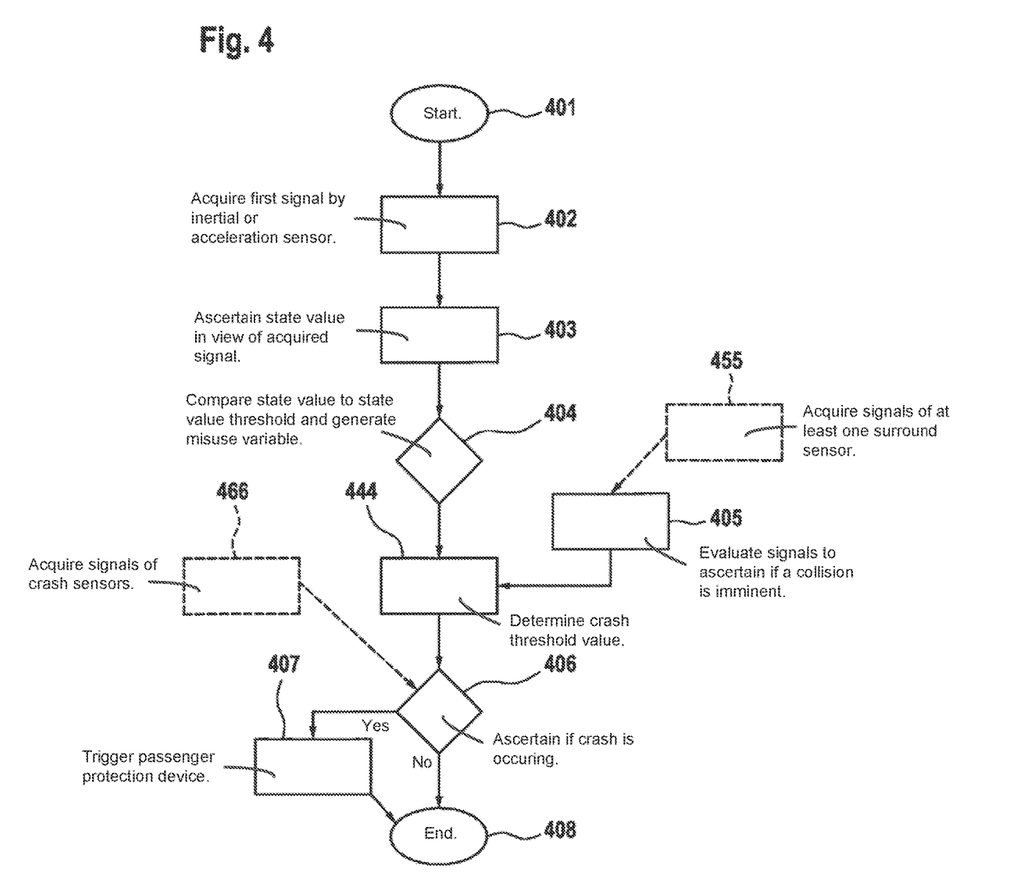
FIG. 4 shows a flow chart of a method for activating a passenger protection device.

A further method, in which a plurality of the above-described methods are combined with each other, is described in FIG. 4. The method starts at step 401.

In step 402, at least one signal of an inertial sensor is acquired. In step 403, this signal is evaluated, and a state value 201 is ascertained with the aid of the signal. This may be ascertained, for example, according to the first method described with reference to FIG. 2.

In step 404, state value 201 is compared to a state threshold value 211, and a misuse variable 204 is generated. This is provided to the function executed in step 444 for ascertaining a crash threshold value.

In step 455, signals of at least one surround sensor are acquired; in this exemplary embodiment, the surround sensor taking the form of a camera. In step 405, these signals are evaluated. In this connection, objects in the vicinity of the vehicle are detected, and it is ascertained if a collision with one of these objects is imminent. In this exemplary embodiment, a probability of such a collision is made available to the function executed in step 444 for ascertaining a crash threshold value.

In step 444, a crash threshold value is ascertained. This is initially fixed, but may be rendered more sensitive in response to the detection of an imminent collision. Whether or not a collision is imminent, is determined in light of the probability of a collision ascertained in step 405. In this exemplary embodiment, an increase in sensitivity corresponds to reducing the crash threshold value, so that a crash is already assumed in response to a low crash signal.

In this exemplary embodiment, whether such an increase in the sensitivity of the crash threshold value is actually made, is also a function of the misuse variable 204 ascertained in step 404. If misuse variable 204 has a value of zero, then the crash threshold value may be rendered more sensitive on the basis of a collision predicted in step 405. However, if misuse variable 204 has a value of one, then an increase in sensitivity of the crash threshold value is suppressed, and consequently, the crash threshold value is not reduced.

Crash detection takes place in step 406, where with the aid of a crash detection function, it is ascertained if a crash is occurring, and therefore, if a passenger protection device should be triggered. For this evaluation, the crash detection function receives signals of crash sensors, in this exemplary embodiment, of several pressure and acceleration sensors, which have been acquired in step 466. In addition, the crash detection function is transmitted the crash threshold value ascertained in step 444.

In this exemplary embodiment, with the aid of the crash detection function, a crash signal is ascertained on the basis of the acquired signals of the crash sensors. If the ascertained crash signal exceeds the crash threshold value determined in step 444, then, in step 407, a passenger protection device is triggered. In this exemplary embodiment, several belt tensioners, airbags and protection devices for pedestrians may be triggered to this end.

If the predefined crash threshold value is not exceeded, then the method moves to step 408, at which it ends, and no passenger protection device is triggered. After the method is run through and step 408 is reached, the method restarts at step 401.

In one alternative specific embodiment of this method, the crash threshold value may also be increased in step 444, during the determination of the crash threshold value. If misuse variable 204 is equal to one, then it may be assumed that the condition of the road is having an influence on crash detection. In order to prevent misinterpretations of a crash situation, the crash threshold value may be increased in this situation.

In one alternative variant, the two information items are evaluated together and weighed against each other, so that the crash threshold value is adapted in an optimum manner.

In one further specific embodiment of the method, in step 404, misuse variable 204 is not provided, but only state value 201 is transmitted. Consequently, in step 404, a more detailed evaluation of the state value 201 currently present may be carried out, and in some instances, the crash threshold value may be adapted to be more sensitive.

In one further exemplary embodiment, a vehicle includes a crash detection function, which is implemented on a processing unit. In addition, the vehicle includes acceleration sensors for ascertaining a collision, as well as surround sensors in the form of a camera, lidar, and radar. Furthermore, a receiving device, with the aid of which conditions of different sections of roadway may be received, is installed in the vehicle.

The crash detection function evaluates the signals of both the surround sensors and the crash sensors. If an imminent collision is detected with the aid of the surround sensors, then the sensitivity of the crash detection is increased, which means that on the basis of the signals of the crash sensors, restraining devices are triggered earlier than would be the case under identical boundary conditions (identical accelerations acting upon the vehicle), without an increase in the sensitivity of the crash detection.

However, the crash detection function is additionally capable of suppressing an increase in sensitivity on the basis of the evaluation of the surround sensor system. This suppression takes place, based on the condition of the surface traveled upon by the vehicle. Since a method, which may rate the condition of the surface presently traveled upon, is not integrated in the vehicle, an information item regarding the condition of the surface traveled upon is received. This is accomplished with the aid of the receiving device installed in the vehicle.

In this connection, the road condition is stored on an external server and transmitted by it to the vehicle and received there. The data stored on the server may be, for example, collected data of a plurality of vehicles, in which functions for ascertaining a condition of a surface traveled upon are executed, and which transmit the ascertained conditions to this server.

In one alternative specific embodiment, the conditions of different roadway sections are already stored in the vehicle, for example, on a digital map. These conditions may be read in by the crash detection function and used for suppressing an increase in the sensitivity of crash detection.

In one alternative specific embodiment, signals regarding a condition of a road are emitted by further vehicles via a car-to-car communications interface and received by the vehicle.

Figure 5:
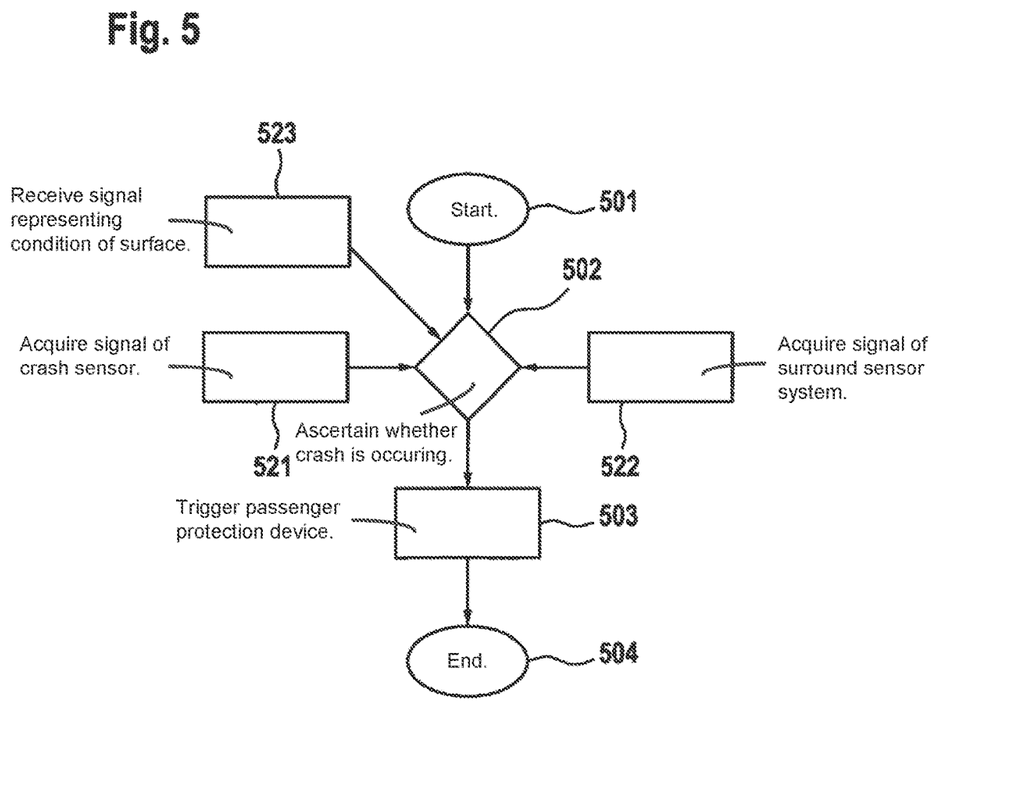
FIG. 5 shows a further flow chart of a method.

The basic method of controlling a passenger protection device for a vehicle, which starts at step 501, is represented in FIG. 5.

In step 502, it is ascertained, with the aid of a crash detection function, whether a crash is occurring. This determination takes place as a function of at least one signal of a crash sensor 521. In this exemplary embodiment, this signal 521 is acquired by an acceleration sensor.

In addition, the determination as to whether a crash is occurring, takes place as a function of a signal of a surround sensor system 522. In this exemplary embodiment, this signal 522 is acquired with the aid of a camera. In this connection, the signal acquired with the aid of the surround sensor system is used for rendering the crash detection function more sensitive.

Furthermore, the determination as to whether a crash is occurring, takes place as a function of a condition 523 of a surface traveled upon by the vehicle. The condition of the road currently traveled upon by the vehicle may be ascertained in different ways. First of all, it is possible for the condition to be ascertained with the aid of acceleration sensors in the vehicle, for example, the available crash sensors. For example, the method represented in FIG. 2 is suitable for this. In this exemplary embodiment, a signal representing this condition 523 is received by a cloud, in which current data regarding different roadway sections are stored.

If, in step 502, it is ascertained, with the aid of the crash detection function, that a crash is occurring, then a passenger protection device is triggered in step 503. The safety device that is triggered, the time after which this is triggered, and the intensity at which this is triggered, are a function of the result of the calculations of the crash detection function. For example, the crash detection function is capable of recognizing different crash severities. In addition, the side on which a crash takes place, as well as whether it is a collision with a vehicle, an object, e.g., a tree, or a person, may be identified. The method ends at step 504.

If, in step 502, it is ascertained, with the aid of the crash detection function, that no crash is occurring, then a passenger protection device is not triggered. The inclusion of the condition 523 of the surface traveled upon by the vehicle is fundamental to this determination and to the present invention.

What is claimed is:

1. A method of controlling a passenger protection device for a vehicle, the method comprising:
changing a state value that represents a condition of a surface and/or of a road travelled by the vehicle as a function of at least one first signal acquired by at least one inertial sensor of the vehicle, wherein in response to the first signal exceeding a signal threshold value, the state value is increased by a predetermined amount;
determining whether the state value exceeds a state threshold value;
changing a second variable that represents presence of a condition of the surface and/or road that could affect crash identification as a function of whether the state value exceeds a state threshold value;
changing a sensitivity to the at least one signal of a crash sensor of a crash detection function;
wherein the change in sensitivity occurs as a function of the second variable that represents the presence of the condition of the surface and/or of the road that could affect crash identification.

2. The method of claim 1, wherein the state value is increased, if the first signal reaches or exceeds a signal threshold value, and/or the state value is decreased, if the first signal falls below the signal threshold value.

3. The method of claim 1, wherein the predetermined amount is increased as a function of an ascertained and/or measured amplitude of the first signal.

4. The method of claim 1, wherein the state value is increased continuously, as long as the first signal exceeds the signal threshold value, after the state value is increased by the predetermined amount.

5. The method of claim 1, wherein the state value is decreased continuously as long as the first signal is less than a signal threshold value.

6. The method of claim 1, wherein the state value is increased as a function of time; a level of the increase being a function of an ascertained and/or measured amplitude of the first signal.

7. The method of claim 1, wherein in response to the first signal exceeding the signal threshold value, the state value increases more sharply per time period than it decreases in the same period in response to the first signal's falling below the signal threshold value.

8. The method of claim 1, wherein a crash is ascertained, if a crash signal, determined with at least one signal acquired by the crash sensor, exceeds a crash threshold value.

9. The method of claim 8, wherein the crash detection function is rendered more sensitive by adjusting the crash threshold value.

10. The method of claim 8, wherein the crash detection function is rendered more sensitive by lowering the crash threshold value.

11. The method of claim 1, wherein the crash detection is rendered more sensitive as a function of at least one surround sensor signal, if an imminent collision is detected with the aid of the at least one surround sensor signal.

12. The method of claim 1, further comprising increasing or decreasing the state value as the function of the at least one first signal acquired by the at least one inertial sensor of the vehicle.

13. The method of claim 12, wherein the crash detection function is not rendered more sensitive, if a condition of a surface and/or of a road, traveled upon by the vehicle is rated as disruptive to the crash detection function; the condition being rated, in particular, as disruptive, if the state value exceeds a state threshold value.

14. The method of claim 12, wherein the crash threshold value is increased, if a condition of a surface and/or of a road, traveled upon by the vehicle is rated as disruptive to the crash detection function; the condition being rated, in particular, as disruptive, if the state value exceeds a state threshold value.

15. The method of claim 1, wherein the state value is increased continuously, as long as the first signal exceeds a signal threshold value, after the state value is increased by the predetermined amount, the state value being continuously increased linearly.

16. The method of claim 1, wherein the state value is decreased continuously, as long as the first signal is less than a signal threshold value; the state value being decreased linearly.

17. A non-transitory computer readable storage medium having a program instructions, which when executed by a processor perform a method of controlling a passenger protection device for a vehicle, the method comprising:
changing a state value that represents a condition of a surface and/or of a road travelled by the vehicle as a function of at least one first signal acquired by at least one inertial sensor of the vehicle, wherein in response to the first signal exceeding a signal threshold value, the state value is increased by a predetermined amount;
determining whether the state value exceeds a state threshold value;
changing a second variable that represents presence of a condition of the surface and/or road that could affect crash identification as a function of whether the state value exceeds a state threshold value;
changing a sensitivity to the at least one signal of a crash sensor of a crash detection function;
wherein the change in sensitivity occurs as a function of the second variable that represents the presence of the condition of the surface and/or of the road that could affect crash identification.

18. The non-transitory computer readable storage medium of claim 17, wherein the state value is increased continuously, as long as the first signal exceeds the signal threshold value, after the state value is increased by the predetermined amount.

19. A processing unit for an electrical machine, comprising:
a controller configured for performing, using an integrated circuit and/or a non-transitory computer program stored on a storage medium, a method of controlling a passenger protection device for a vehicle, the method comprising:
changing a state value that represents a condition of a surface and/or of a road travelled by the vehicle as a function of at least one first signal acquired by at least one inertial sensor of the vehicle, wherein in response to the first signal exceeding a signal threshold value, the state value is increased by a predetermined amount;
determining whether the state value exceeds a state threshold value;
changing a second variable that represents presence of a condition of the surface and/or road that could affect crash identification as a function of whether the state value exceeds a state threshold value;
changing a sensitivity to the at least one signal of a crash sensor of a crash detection function;
wherein the change in sensitivity occurs as a function of the second variable that represents the presence of the condition of the surface and/or of the road that could affect crash identification.

20. The processing unit of claim 19, wherein the state value is increased continuously, as long as the first signal exceeds the signal threshold value, after the state value is increased by the predetermined amount.

* * * * *